United States Patent
Ziegler

(10) Patent No.: US 8,448,194 B2
(45) Date of Patent: May 21, 2013

(54) VALUE CONTAINER PROPAGATION IN DEVELOPMENT TOOLS, BUSINESS PROCESS MANAGEMENT, AND BUSINESS RULES MANAGEMENT SOLUTIONS

(75) Inventor: Carsten Ziegler, Schlossweg (DE)

(73) Assignee: SAP AG, Walldorf (DE)

( * ) Notice: Subject to any disclaimer, the term of this patent is extended or adjusted under 35 U.S.C. 154(b) by 838 days.

(21) Appl. No.: 12/588,002

(22) Filed: Sep. 30, 2009

(65) Prior Publication Data

US 2011/0078710 A1    Mar. 31, 2011

(51) Int. Cl.
*G06F 13/00*    (2006.01)

(52) U.S. Cl.
USPC ........... 719/330; 719/331; 719/332; 717/100; 717/106

(58) Field of Classification Search .................. 719/330, 719/331, 332; 717/100, 106
See application file for complete search history.

(56) References Cited

U.S. PATENT DOCUMENTS

| | | | |
|---|---|---|---|
| 2005/0071347 A1* | 3/2005 | Chau et al. | 707/100 |
| 2008/0154663 A1* | 6/2008 | Savur et al. | 705/7 |
| 2008/0222635 A1* | 9/2008 | Tommasi et al. | 718/100 |
| 2010/0017783 A1* | 1/2010 | Brininstool et al. | 717/101 |

* cited by examiner

*Primary Examiner* — Andy Ho
(74) *Attorney, Agent, or Firm* — Finnegan, Henderson, Farabow, Garrett & Dunner, LLP

(57) ABSTRACT

Systems and methods consistent with the invention include propagating parameter definitions between computer elements and may include at least one memory device containing computer readable instructions. Also included is a computer processor executing the instructions on the memory device to perform the steps of selecting a sub-routine to be called by a calling unit. The processor may determine whether a definition for a parameter in the selected sub-routine is known to the calling unit using the computer processor, the calling unit also containing a definition for a parameter. The definitions for the parameters that are unknown to the calling unit are incorporated into the selected sub-routine using the computer processor. The process of the calling unit is executed. The computer processor is used to bind the definition for the parameter in the sub-routine to the definition of the parameter contained in the calling unit.

20 Claims, 4 Drawing Sheets

VALUE CONTAINER PROPAGATION IN DEVELOPMENT TOOLS, BUSINESS PROCESS MANAGEMENT, AND BUSINESS RULES MANAGEMENT SOLUTIONS

BACKGROUND

1. Relevant Field

Systems and methods consistent with the present invention generally relate to defining data during software development. More particularly, systems and methods consistent with the invention relate to the automatic creation of data definitions used to execute a particular sub-routine according to software code developed by a user.

2. Background Information

Businesses and other organizations commonly develop computer software that is suitable to conduct business in a manner consistent with each businesses' or organizations' needs. Generally, software development is so expensive and time consuming that in many situations businesses or other organizations cannot devote sufficient resources to generate a software program that will operate in accordance with the entity's needs. It is advantageous to these businesses and other organizations to customize a particular base software program instead of developing a software program from the bottom up.

In order to specialize or customize a base program, a business or other organization must be allowed to alter the base software program in order to implement software that satisfies the entities needs. Frequently, a business or other organization must hire a software developer to specialize or customize the base software program so that it meets the needs of the business or other organization. Software developers write program code, business processes, and business rules to specialize or customize the base software program.

In some cases program code, business processes, or business rules make reference to one or more sub-routines. Such references are termed a "call." A software program defined by program code, business processes, or business rules typically call various sub-routines in order to execute a pre-defined action. These actions may be methods (in the case of object oriented programming), functions or forms (in functional programming), and web services. Sub-routines typically define an interface with parameters specified in the program code. The sub-routine is responsible for determining whether the parameters are "incoming," "changing," or "outgoing." These parameters may also be referred to as a "value."

Conventionally, it has been a software developer's responsibility to create data definitions that hold values that will be passed to or taken from the sub-routine. A value retrieved from one sub-routine may be used in the next sub-routine. Values may be available at the time the first sub-routine is called or the value may be initially retrieved from the first called sub-routine that returns the particular value in question.

Software developers are burdened by the complexities of maintaining the data definitions and their associated values. To reduce this burden, software developers may define the data definitions as variables. Variables may be used in a routine when developing program code, business processes, or business rules. For business process management, however, a value container must be defined to hold variables and values of a process during execution. While the general concepts involved in defining variables and business process are similar, different terms are used to distinguish development of program code and business processes. The same concepts apply to business rules, though the terms used to describe business rules may vary.

The complexities involved in maintaining data definitions and their associated values during development of program code, business processes, or business rules reduces software development efficiency. This lack of efficiency causes even the least complicated software programs to be so expensive that many business or other organizations would rather use a software program that lacks specialization or customization and does not fully meet their needs.

In view of the foregoing, it is desirable to increase the efficiency of maintaining data definitions and their associated values during development of program code, business processes, and/or business rules. For example, there is a need for an improved method and system to associate data definitions and/or value containers with the appropriate routines to reduce the complexity of software development.

SUMMARY

In accordance with one embodiment of the invention, a method of propagating parameter definitions between computer elements is disclosed. The method is implemented by a computer system and may comprise: selecting a sub-routine to be called by a calling unit; determining whether a definition for a parameter in the selected sub-routine is known to the calling unit using a computer processor, the calling unit also containing a definition for a parameter; incorporating the definition for the parameter in the selected sub-routine that are unknown to the calling unit into the calling unit automatically using the computer processor; executing the process of the calling unit using the computer processor; and binding the definition for the parameter in the sub-routine to the definition of the parameter contained in the calling unit automatically using the computer processor, the binding being based on contexts in the calling unit.

In accordance with yet another embodiment of the invention a system of propagating parameter definitions between computer elements is disclosed. The system may comprise: at least one memory device containing computer readable instructions; a computer processor executing the instructions on the at least one memory device to perform the steps of: selecting a sub-routine to be called by a calling unit; determining whether a definition for a parameter in the selected sub-routine is known to the calling unit using a computer processor, the calling unit also containing a definition for a parameter; incorporating the definition for the parameter in the selected sub-routine that are unknown to the calling unit into the calling unit automatically using the computer processor; executing the process of the calling unit using the computer processor; and binding the definition for the parameter in the sub-routine to the definition of the parameter contained in the calling unit automatically using the computer processor, the binding being based on contexts in the calling unit.

In accordance with yet another embodiment of the invention, a computer-readable storage medium including instructions which, when executed on a processor, cause the processor to perform a method of propagating parameter definitions between computer elements is disclosed. The method is implemented by a computer system and may comprise: selecting a sub-routine to be called by a calling unit; determining whether a definition for a parameter in the selected sub-routine is known to the calling unit using a computer processor, the calling unit also containing a definition for a parameter; incorporating the definition for the parameter in the selected sub-routine that are unknown to the calling unit into the calling unit automatically using the computer processor; executing the process of the calling unit using the computer processor; and binding the definition for the parameter in the sub-routine to the definition of the parameter contained in the calling unit automatically using the computer processor, the binding being based on contexts in the calling unit.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
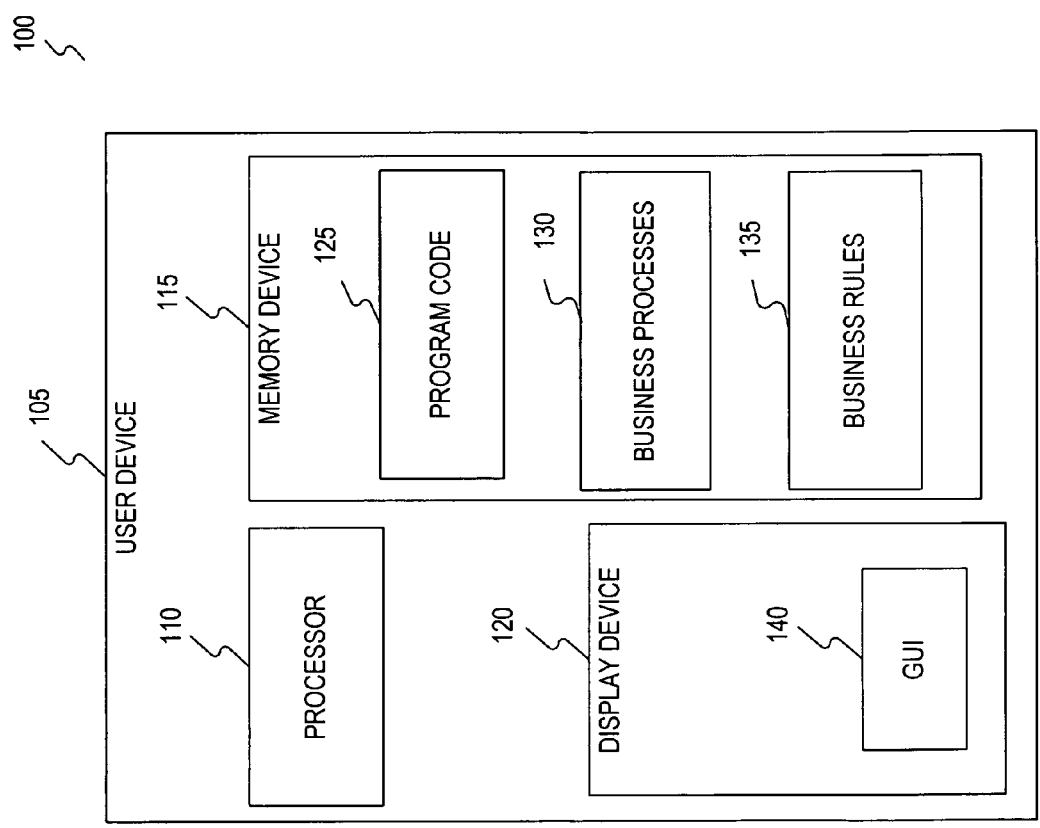
FIG. 1 illustrates an exemplary computer system consistent with the present invention.

The following detailed description refers to the accompanying drawings. Wherever possible, the same reference numbers are used in the drawings and in the following description to refer to the same or similar parts. While several exemplary embodiments and features of the invention are described herein, modifications, adaptations, and other implementations are possible without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to optimizing the development of software that is easily specialized and/or customized for a particular business or other organization. Exemplary software development engines that may be used in systems consistent with the invention include those offered by SAP AG, such as Business Rules Management Plus (BRFplus), Business Process Management, and ABAP programming. Additionally, other systems that may be used that are consistent with the invention include a code editor for programming languages. These systems and methods help software developers create business rules and business processes, and implement those rules and processes as program code.

Business rules are used to represent the business logic of each organization. Business rules are implemented as part of business processes to ensure that each process executes transactions in a manner consistent with the predetermined business logic represented by the business rules. The systems and methods discussed above enable a business or other organization to describe its operations and determine its operating constraints in a computer readable format. Business rules may include business habits, manuals, policies, lines of computer code, and any other set of decision making options.

Business and other organizations frequently change policies in order to react to business transactions and the marketplace. When businesses and other organizations implement business rules, the businesses and other organizations can react and adapt quickly to the economic environment in which they operate. Business processes and business rules implemented as part of a set of computer instructions and computer readable program code allow a business to employ a computer system to react to business transactions and the marketplace with increased agility and flexibility.

An example of a computer system consistent with the present invention is shown in FIG. 1. FIG. 1 shows computer system 100 that includes user device 105. User device 105 may be a general purpose computer, a personal computer, a workstation, a mainframe computer, a notebook, a global positioning device, a laptop computer, a smart phone, a personal digital assistant, a network server, and any other electronic device that may interact with a user to develop programming code.

Although not shown, the various components of the user device need not be fully contained within the user device. Each of the components may be physically separated from another and more than one of the components may be used to perform methods consistent with the present invention. Even though the components may be physically separated, the components may still be communicably connected by means of wired or wireless technology. For example, different components of system 100 and user device 105 may be connected through the Internet, a LAN (local area network), a WAN (wide area network), databases, servers, RF (radio frequency) signals, cellular technology, Ethernet, telephone, "TCP/IP" (transmission control protocol/internet protocol), and any other electronic communication format.

The basic components of user device 105 include processor 110, display device 120, and memory device 115, although user device 105 may contain other components including those components that facilitate electronic communication. Other components may include user interface devices such as a input and output devices (not shown). User device 105 may include computer hardware components such as a combination of Central Processing Units (CPUs) or processors, buses, memory devices, storage units, data processors, input devices, output devices, network interface devices, and other types of components that will become apparent to those skilled in the art. User device 105 may further include application programs that may include software modules, sequences of instructions, routines, data structures, display interfaces, and other types of structures that execute operations of the present invention.

One of the hardware components in user device 105 is processor 110. Processor 110 may be an ASIC (Application Specific Integrated Circuit) or it may be a general purpose processor. Processor 110 may include more than one processor. For example, processors may be situated in parallel, series, or both in order to process all or part of the computer instructions that are to be processed.

Memory device 115 may include all forms of computer-readable storage mediums such as non-volatile or volatile memories including, by way of example, semiconductor memory devices, such as EPROM, RAM, ROM, DRAM, EEPROM, and flash memory devices; magnetic disks such as internal hard disks and removable disks; magneto-optical disks; DVD disks, and CD-ROM disks. Memory device 115 may be used to store program code 125, business processes 130, or business rules 135.

Display device 120 may be any conventional user interface display device. For example, display device 120 may include computer monitors, televisions, and LCD displays. Display device 120 may display GUI (Graphical User Interface) 140 which allows a user to interact with computer system 100 hardware and software applications embodied in user device 105.

Figure 2:
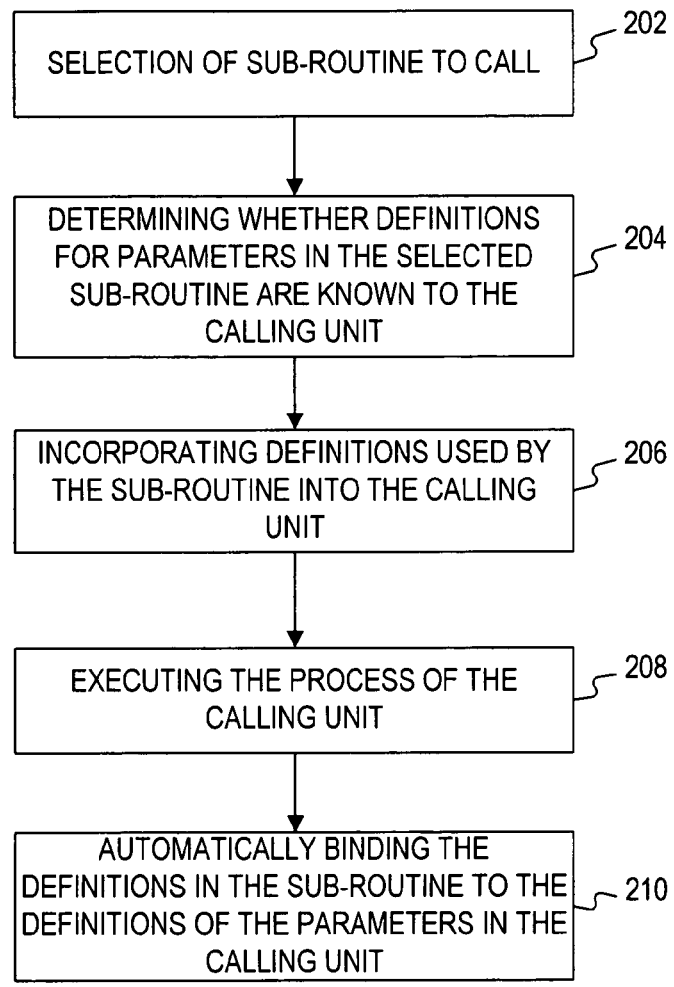
FIG. 2 is a flowchart illustrating an overview of an exemplary method of associating sub-routine parameters with those of a calling unit, consistent with the present invention.

FIG. 2 is a flowchart illustrating an overview of exemplary method 200 which is used to associate sub-routine parameters with those of a calling unit. A calling unit may be any software application; program code; web service; computer processor, such as processor 110 shown in FIG. 1; or any other system component that refers to a sub-routine as part of a process, program code, web service, or software application.

For purposes of explanation, the calling unit may also be referred to as a software method or routine, though it may also comprise a business rule that calls a data retrieval expression. A sub-routine may be a program component of a another routine and may be called by rules, methods, or both. A sub-routine may also correspond to a step in a framework of business logic. A typical software application comprises a significant amount of program code which may comprise a software method. These software methods are blocks of programming code that are designed to perform a specific function or output a specific result. One or many sub-routines may be constructed as necessary in a software application in order for a software developer to develop an application that performs a specific function or produces a specific result.

Complicated software applications may refer to thousands of sub-routines or possibly more. Each sub-routine further comprises a number of parameters that may refer to variables. Each time a calling unit calls a specific sub-routine, those parameters have heretofore been manually included in the parameters designated for the calling unit in order to produce the desired result or function. Manually including the a number of parameters for each of the many sub-routines into the calling unit by the software developer is tedious and inefficient.

In step 202, a sub-routine may be selected by a user. Alternatively, selection in step 202 may further be accomplished by a processor or a calling unit. Selection step 202 allows a user, such as a software developer, to determine which sub-routines should be called by the calling unit. After the user has selected the appropriate sub-routine, a computer processor may be used to determine whether the definitions for the parameters in the selected sub-routine are known to the calling unit in step 204. If it is determined that the calling unit does not refer to a particular parameter in the sub-routine, at step 206, the definitions for the parameters of the sub-routine are automatically incorporated into the variables of the calling unit. If the definition of the variable is found to correspond to a parameter definition, the system may set the variable and the parameter as default equivalents.

Although not shown as part of method 200, when incorporation of the parameter definitions take place in step 206, errors may be created. These errors may be because of an ambiguity in the naming convention for the parameters in the sub-routine and the calling unit, or may be the result of another clarity discrepancy. At this point, a user may be asked whether or not the user wants to change a parameter definition the system determines might be ambiguous by means of a pop-up window. If there are no ambiguities in the parameter definitions, the method proceeds to step 208.

At step 208, the process that is to be performed by the calling unit is executed. As part of the execution, the parameter definitions that were previously only available to a sub-routine are now available to the calling unit after the automatic incorporation of step 206. At this point, each of the parameter definitions for each individual sub-routine in the calling unit is available to the calling unit. This automatic incorporation ensures that a software developer does not have to specifically allocate the parameter definitions for every sub-routine called by the calling unit resulting in an increase in the developer's efficiency. After the execution of the process of the calling unit in step 208, the method moves to step 210.

At step 210, method 200 may automatically bind the parameter definitions in one or more sub-routines to the parameters definitions of the calling unit. When the parameters of the sub-routines called by a calling unit are bound to the parameters of the calling unit, the parameter definitions are available to the calling unit in the context of the calling method. At this point, if the system recognizes an ambiguity, the system may ask the user, whether or not the user wants to change a parameter definition as discussed above. While the preferred embodiment of the system asking the user whether or not the user wants to change a parameter definition is a pop-up window, other means of user notification and interface that are known to those of skill in the art may be used.

An application program or a calling unit may have a specific context that requires a parameter definition in the case of programming code or a value container in the case of a business process. The context allows the parameter definition or the value container to be bound, or linked, to the context that uses the variables or values contained in the parameter definition or the value containers.

Contexts are typically defined by global data types, data dictionary definitions, and etc. When a context corresponding to a parameter definition or a value container is defined in the system, the parameter definition or the value container is automatically bound to that context. In some cases, however, a context for a particular parameter definition or value container may not be known to the system. When the system realizes that a parameter definition or a value container exists in a sub-routine that is not known to the system as a whole, the system creates a new context definition for that parameter definition or value container and binds the parameter definition or value container to the newly created context definition.

Figure 3:
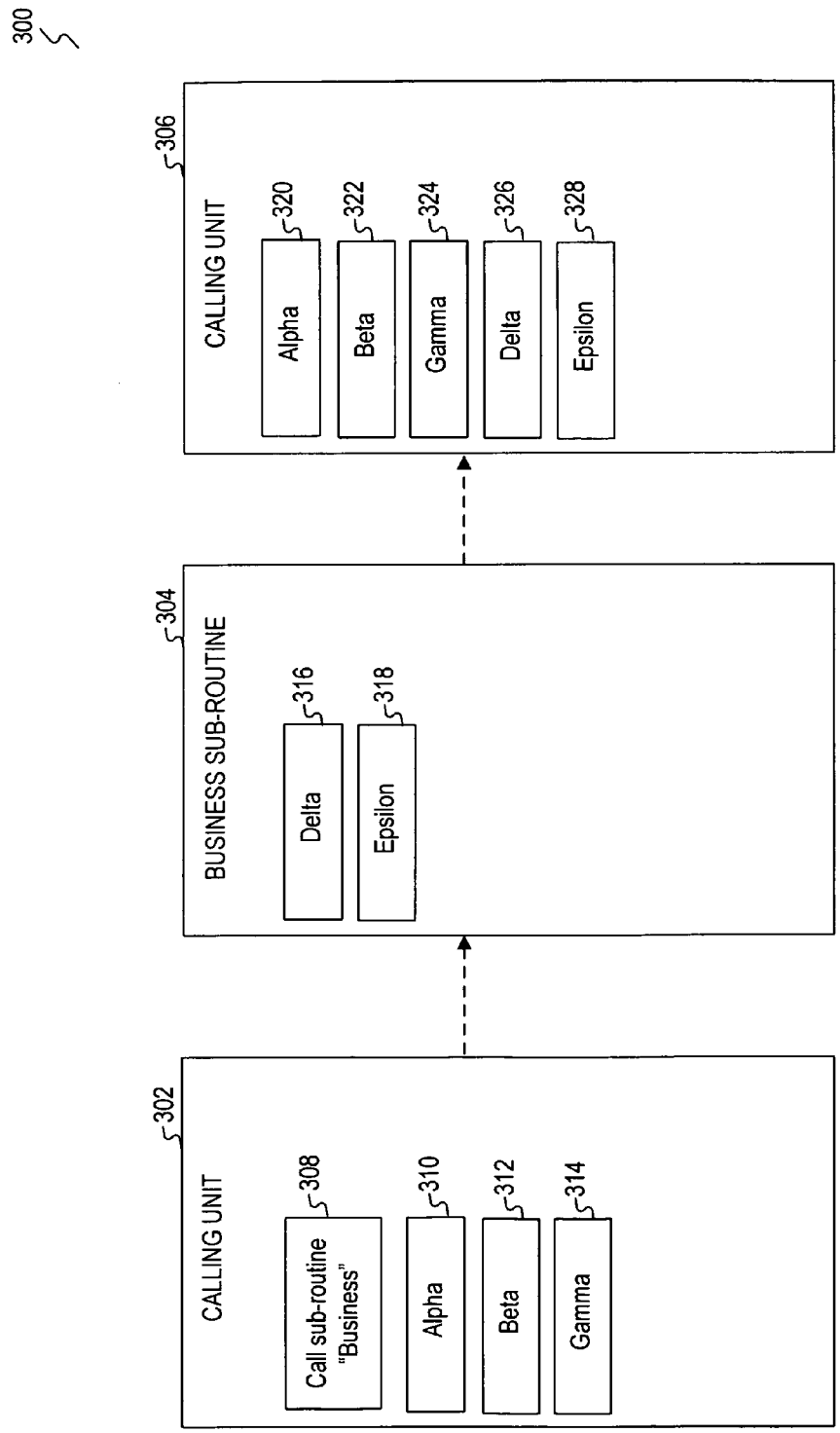
FIG. 3 is a block diagram illustrating an exemplary outcome of the method shown in FIG. 2, consistent with an embodiment of the present invention.

FIG. 3 shows an example of a block diagram illustrating an exemplary illustration of the method shown in FIG. 2 described relative to program code. Example 300 includes calling unit 302, business sub-routine 304, and calling unit 306. As will be described below, calling unit 302 and calling unit 306 are the same calling unit shown at two different points in time. Calling unit 302 is a process designed to perform a specific function or a specific result. In order to perform the specific function or perform a specific result, a user selects an instruction, instruction 308, to call a sub-routine designated as "Business" sub-routine 304 to call because sub-routine 304 performs at least part of the desired function or provides at least a portion of a desired result. Additionally, calling unit 310 requires, for purposes of example only, three parameter definitions designated as Alpha (310), Beta (312), and Gamma (314) to perform the desired function or provide the desired result.

After the user selects sub-routine 304 as a sub-routine that will be called, the system determines whether definitions for the parameters in sub-routine 304 are known to calling unit 302. Business sub-routine 304, for purposes of explanation only, contains two parameter definitions Delta (316) and Epsilon (318). Both parameter definitions 316 and 318 are unknown to the calling unit because none of parameter definitions 316 and 318 constitute any of parameter definitions 310, 312, or 314. The system identifies parameter definitions 316 and 318 as unknown.

Because parameter definitions 316 and 318 are unknown to the system, parameter definitions 316 and 318 are automatically incorporated from sub-routine 304 into calling unit 304.

As shown in FIG. 3, the result of the incorporation is that calling unit 302 becomes calling unit 306. Calling unit 306 shows each of the parameter definitions that were part of calling unit 302 and subroutine 304 as parameter definitions Alpha (320), Beta (322), Gamma (324), Delta (326), and Epsilon (328).

At this point the process defined by calling unit 306 may be executed since each of the parameter definitions necessary to perform a function or produce a result are available to calling unit 306. Parameter definitions 320, 322, 324, 326, and 328 may be automatically bound to the calling unit so that parameter definitions 316 and 318 (which were part of sub-routine 304) are otherwise indistinguishable as parameters of calling unit 306.

In example 300, some of parameter definitions 320, 322, 324, 326, and 328 may be known to the context in the system based on, for example, global data types and data dictionary definitions. In that case, the parameter definition may be bound to that context. For example, if the definition of a variable is found to correspond to a parameter definition, the system may set the variable and the parameter as default equivalents. In cases where a parameter definition is not known to the system, the system creates a new context definition for the unknown parameter definition and binds the parameter definition to the newly created context definition.

As a result of this process, each of the parameter definitions in any called sub-routine is available to a calling unit at any time. Because the software developer need only specify a sub-routine to be called, the software developer's efficiency is increased. In this process, the software developer need not devote as much attention to the specific parameter definitions of each sub-routine since they are automatically incorporated into any calling method. When the parameter definitions are bound to the calling unit, the parameter definitions are permanently available to the calling unit as part of the application program.

Figure 4:
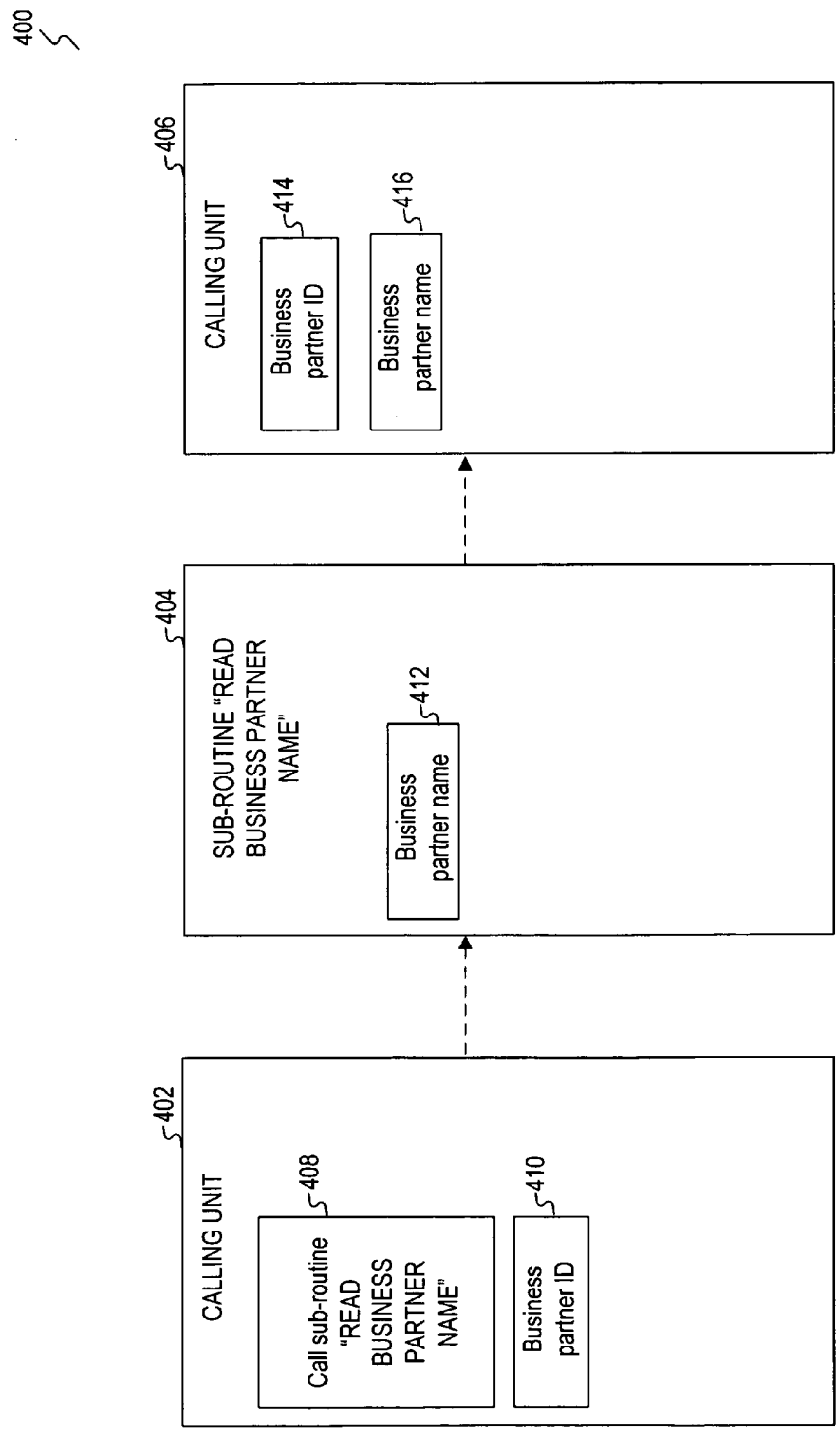
FIG. 4 is a block diagram illustrating an exemplary outcome of the method shown in FIG. 2, consistent with an embodiment of the present invention.

FIG. 4 shows an example of a block diagram illustrating an exemplary illustration of the method shown in FIG. 2 described relative to a business process. Example 400 includes calling unit 402, sub-routine 404 entitled "Read Business Partner Name," and calling unit 406. As will be described below, calling unit 402 and calling unit 406 are the same calling unit shown at two different points in time. Calling unit 402 is a process designed to call (408) sub-routine 404 and input a business partner ID 410 into the sub-routine. Sub-routine 404 returns a business partner name 412.

Business partner ID 410 may be referred to as a value container and may contain variables and values required by the calling unit. Business partner ID 410 is treated by sub-routine 404 as an "incoming" value. Calling unit 402 may call more than one sub-routine and in most practical circumstances will call more than one sub-routine. Calling unit 402, prior to call 408 may also contain more than one value container. Practical implementations of the process shown in FIG. 2 may contain many thousands of value containers although the exact number may be determined at the discretion of the software developer. For simplicity of explanation, example 400 shows a single value container 410.

Sub-routine 404 contains business partner name 412 and may also be referred to as a value container. Business partner name 412 may contain variables and values required by the calling unit. Business partner name 412 may be treated by sub-routine 404 as a "changing" or an "outgoing" value. Similarly to calling unit 402, sub-routine 404 may contain more than one value container. Although sub-routine 404 is unlikely to contain as many value containers as calling unit 402, sub-routine 404 may also contain many thousands of value containers. The exact number of value containers in sub-routine 404, as before, may be determined at the discretion of the software developer.

At the outset of example 400, a user selects sub-routine 404 as a sub-routine that will be called at step 408. The system determines which value containers in sub-routine 404 are known to calling unit 402. In the case of example 400, there are no value containers in sub-routine 404 that are also known to calling unit 402. Although when, for example, calling unit 402 contains thousands of value containers and sub-routine 404 contains hundreds of value containers, it is more likely that at least some value containers in sub-routine 404 will also be known to calling unit 402. Since calling unit 402 and sub-routine 404 do not have any value containers in common between them, the system will identify business partner name value container 412 as unknown.

When the system determines business partner name value container 412 from sub-routine 404 is unknown, the system begins incorporating the unknown business partner name value container 412 into calling unit 404. As shown in FIG. 4, the result of the incorporation is that calling unit 402 becomes calling unit 406. Calling unit 406 shows each of the value containers that were part of calling unit 402 and sub-routine 404 as value container business partner ID 414 and business partner name 416.

When calling unit 406 contains all of the value containers for each sub-routine to which it refers, the process of calling unit 406 may be executed. In this case, business partner ID 410 is automatically bound to a context in the calling unit called "Business Partner ID." The binding assumes that a "Business Partner ID" context is known to the system as a global data type, a data dictionary definition, and etc. Business Partner Name 416 is bound to a newly created definition in the calling unit called "Business Partner Name." In this case, we assume that the system did not find a context called "Business Partner Name." When a context such as "Business Partner Name" is not found in the system, a new definition is created in the system.

In example 400, the software developer must select a sub-routine corresponding to a step in the business logic of a business process to be implemented. The sub-routine may, therefore, be considered as a business rule in a business process. The business process may be implemented as a web service in a Business Process Management tool used to define a business process. The business rule may also be used as a calling unit that in turn calls another sub-routine, a data retrieval expression, or some other program code that calls another method.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of propagating parameter definitions between computer elements, the method being implemented by a computer system and comprising:

selecting a sub-routine to be called by a calling unit;

determining whether a definition for a parameter in the selected sub-routine is known to the calling unit using a computer processor, the calling unit also containing a definition for a parameter;

incorporating the definition for the parameter in the selected sub-routine that are unknown to the calling unit into the calling unit using the computer processor;

executing the process of the calling unit using the computer processor; and binding the definition for the parameter in the sub-routine to the definition of the parameter contained in the calling unit using the computer processor, such that:

the binding is based on contexts in the calling unit; and the parameter definition remains available to the calling unit after executing the process.

2. The method of claim 1, wherein the definition for the parameter in the sub-routine and the definition for the parameter in the calling unit are value containers.

3. The method of claim 2, wherein the sub-routine is a business process and contains business rules.

4. The method of claim 1, further comprising implementing a web service with a business process management tool.

5. The method of claim 1, wherein the determining whether the definition for the parameter in the selected subroutine are known to the calling unit using the computer processor further includes an error message when an ambiguity exists in the naming convention for the definition for the parameter in the subroutine and the definition for the parameter in the calling unit.

6. The method of claim 5, wherein the error message is a pop-up window message on a user display.

7. The method of claim 1, wherein the context is a global data type or a data dictionary definition.

8. A system for propagating parameter definitions between computer elements, the system comprising:

at least one memory device containing computer readable instructions;

a computer processor executing the instructions on the at least one memory device to perform the steps of:

selecting a sub-routine to be called by a calling unit;

determining whether a definition for a parameter in the selected sub-routine is known to the calling unit using the computer processor, the calling unit also containing a definition for a parameter;

incorporating the definition for the parameter in the selected sub-routine that are unknown to the calling unit into the calling unit using the computer processor;

executing the process of the calling unit using the computer processor; and binding the definition for the parameter in the sub-routine to the definition of the parameter contained in the calling unit using the computer processor, such that:

the binding is based on contexts in the calling unit; and the parameter definition remains available to the calling unit after executing the process.

9. The system of claim 8, wherein the definition for the parameter in the sub-routine and the definition for the parameter in the calling unit are value containers.

10. The system of claim 9, wherein the sub-routine is a business process and contains business rules.

11. The system of claim 10, further comprising a web service implemented as a business process management tool.

12. The system of claim 8, wherein the determining whether the definition for the parameter in the selected sub-routine are known to the calling unit using the computer processor further includes an error message when an ambiguity exists in the naming convention for the definition for the parameter in the sub-routine and the definition for the parameter in the calling unit.

13. The system of claim 12, wherein the error message is a pop-up window message on a user display.

14. The system of claim 8, wherein the context is a global data type or a data dictionary definition.

15. A non-transitory computer-readable storage medium including instructions which, when executed on a processor, cause the processor to perform a method of propagating parameter definitions between computer elements, the method comprising selecting a sub-routine to be called by a calling unit;

determining whether a definition for a parameter in the selected sub-routine is known to the calling unit using a computer processor, the calling unit also containing a definition for a parameter;

incorporating the definition for the parameter in the selected sub-routine that are unknown to the calling unit into the calling unit using the computer processor;

executing the process of the calling unit using the computer processor; and binding the definition for the parameter in the sub-routine to the definition of the parameter contained in the calling unit using the computer processor, such that:

the binding is based on contexts in the calling unit; and the parameter definition remains available to the call unit after the step of executing the process.

16. The non-transitory computer-readable medium of claim 15, wherein the definition for the parameter in the sub-routine and the definition for the parameter in the calling unit are value containers.

17. The non-transitory computer-readable medium of claim 16, wherein the sub-routine is a business process and contains business rules.

18. The non-transitory computer-readable medium of claim 15, further comprising a web service implemented as a business process management tool.

19. The non-transitory computer-readable medium of claim 15, wherein the context is a global data type or a data dictionary definition.

20. The non-transitory computer-readable medium of claim 15, wherein the instructions in the computer-readable medium may comprise one of program code, business rules, or business processes.

* * * * *